US009801075B2

(12) United States Patent
Jong et al.

(10) Patent No.: US 9,801,075 B2
(45) Date of Patent: Oct. 24, 2017

(54) SIZING SATELLITE BEAM CAPACITY

(71) Applicant: Hughes Network Systems, LLC, Germantown, MD (US)

(72) Inventors: James Jehong Jong, North Potomac, MD (US); David Roos, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/056,350

(22) Filed: Feb. 29, 2016

(65) Prior Publication Data
US 2017/0251379 A1 Aug. 31, 2017

(51) Int. Cl.
*H04W 16/24* (2009.01)
*H04B 7/185* (2006.01)
*H04W 84/06* (2009.01)

(52) U.S. Cl.
CPC .......... *H04W 16/24* (2013.01); *H04B 7/185* (2013.01); *H04W 84/06* (2013.01)

(58) Field of Classification Search
None
See application file for complete search history.

(56) References Cited

U.S. PATENT DOCUMENTS

| | | | | |
|---|---|---|---|---|
| 5,732,383 A | * | 3/1998 | Foladare | G08G 1/0104 455/456.5 |
| 6,141,534 A | * | 10/2000 | Snell | H04B 7/18513 455/10 |
| 2004/0092257 A1 | * | 5/2004 | Chung | H04B 7/2041 455/429 |
| 2010/0015926 A1 | * | 1/2010 | Luff | H04L 41/0604 455/67.13 |
| 2013/0095822 A1 | * | 4/2013 | Swardh | H04B 7/2041 455/428 |
| 2013/0109299 A1 | * | 5/2013 | Roos | H04B 7/18528 455/12.1 |
| 2013/0244570 A1 | * | 9/2013 | Park | H04B 7/18539 455/12.1 |
| 2016/0072613 A1 | * | 3/2016 | Esserman | H04L 5/0037 370/230 |

OTHER PUBLICATIONS

Optimal Throughput Allocation in General Random-Access Networks by Gupta et al., dated Mar. 2006.*

* cited by examiner

*Primary Examiner* — Daniel Lai
(74) *Attorney, Agent, or Firm* — Bejin Bieneman PLC

(57) ABSTRACT

A processor includes a memory storing instructions executable by the processor. The instructions include determining a capacity of a plurality of satellite beams based at least in part on a beam traffic density associated with each of the plurality of satellite beams and transmitting, to a communication satellite, a control signal that commands the communication satellite to transmit the plurality of satellite beams in accordance with the beam traffic density determined by the processor. The processor may be incorporated into a telecommunications system that includes a communication satellite programmed to transmit signals in accordance with a plurality of beams.

20 Claims, 3 Drawing Sheets

Average and Peak Number of Ships for Each Beam

|        | Average | Peak | Peak-to-Average |
|--------|---------|------|-----------------|
| Beam 1 | 1.4     | 3    | 2.1             |
| Beam 2 | 1.2     | 2    | 1.7             |
| Beam 3 | 0.9     | 2    | 2.1             |
| Beam 4 | 0.0     | 0    | N/A             |
| Beam 5 | 1.4     | 4    | 2.8             |
| Beam 6 | 1.2     | 3    | 2.5             |
| Beam 7 | 1.7     | 7    | 4.2             |
| Beam 8 | 1.2     | 3    | 2.5             |
| Total  | 9       | 24   |                 |

FIGURE 3

Example Beam Traffic Densities According to Different Metrics

|        | Mean  | Peak | $M(0.9)$: 90% | $M(0.95)$: 95% | Mean While Active |
|--------|-------|------|---------------|----------------|-------------------|
| Beam 1 | 1400  | 3000 | 1800          | 2400           | 1647              |
| Beam 2 | 1200  | 2000 | 1500          | 1800           | 1412              |
| Beam 3 | 900   | 2000 | 1100          | 1600           | 1059              |
| Beam 4 | 0.114 | 1000 | 0             | 0              | 1000              |
| Beam 5 | 1400  | 4000 | 2600          | 3400           | 3684              |
| Beam 6 | 1200  | 3000 | 1500          | 2000           | 2667              |
| Beam 7 | 1700  | 7000 | 3000          | 5000           | 6800              |
| Beam 8 | 1200  | 3000 | 2000          | 2400           | 2182              |

FIGURE 4

Example Beam Capacity Allocation Using Metric M(0.95)

|   | M(0.95): users | Mbps with 100 kbps/user | Efficiency (bps/Hz) | # of 100 MHz Carriers | Allocated Beam Throughput (Mbps) |
|---|---|---|---|---|---|
| Beam 1 | 2400 | 240 | 1.25 | 2 | 250 |
| Beam 2 | 1800 | 180 | 1.25 | 2 | 250 |
| Beam 3 | 1600 | 160 | 1.25 | 2 | 250 |
| Beam 4 | 0 | 0 | 1.25 | 0 | 0 |
| Beam 5 | 3400 | 340 | 1.25 | 3 | 375 |
| Beam 6 | 2000 | 200 | 1.25 | 2 | 250 |
| Beam 7 | 5000 | 500 | 1.25 | 4 | 500 |
| Beam 8 | 2400 | 240 | 1.25 | 2 | 250 |

SIZING SATELLITE BEAM CAPACITY

BACKGROUND

Conventional satellite designs focus beam capacity where the beams are expected to be the most useful. For geosynchronous satellites, the beam capacity may be focused on a particular geographic region. In instances where a single satellite services multiple regions, different communication frequencies are used to reduce interference of geographically adjacent beams.

BRIEF DESCRIPTION OF THE DRAWINGS

FIG. 3 is a table of example data that can be used to determine beam traffic density, including data related to the average and peak number of mobile communication systems for each beam.

FIG. 4 is a table of example beam traffic densities according to different metrics.

DETAILED DESCRIPTION

Typical geostationary satellites have coverage area or footprint fixed on the ground. For multi-beam satellite systems, the footprint is further divided into cells (i.e., beams). This partitioning of the footprint into multiple cells (see FIG. 1) allows reusing the same spectrum over geographically separately areas. With the frequency reuse, the total communication spectrum between the terminals and satellite increases proportionally with the number of times the allocated spectrum is reused. For example, at 30 GHz Ka-band, typical available bandwidth is no more than 3 GHz. Taking advantage of spatial isolation among the beams, if the 3 GHz frequency can be reused 20 times over the satellite footprint, the effective total system bandwidth becomes 60 GHz. In general, the multi-beam satellite system capacity can be represented by $$C_{system} = N_{beam} \cdot S_{beam} \quad (1)$$

where $N_{beam}$ is the number of the beam, and $S_{beam}$ is the throughput per beam (average bits per second per beam).

Although having a large number of small cells allows higher spectrum reuse and increases the system capacity, a smaller cell requires a bigger satellite antenna complicating satellite designs and increasing cost. Hence, it is important to have a balanced design that meets the required capacity without unnecessarily increasing satellite cost exponentially.

For maritime or aviation satellite services where the terminals (ships or airplanes that carry a satellite modem) move around among ports and according to pre-scheduled routes, certain beams tend to have a very high number of simultaneous terminals at a particular time of instance.

Figure 2:
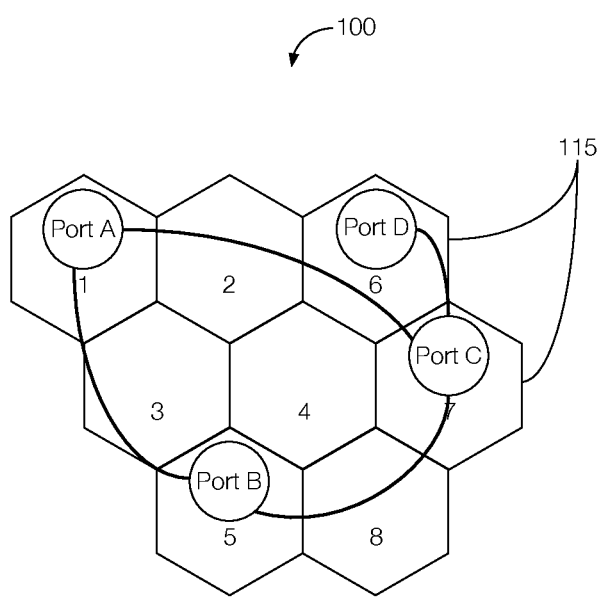
FIG. 2 illustrates an example satellite beam layout with multiple port locations and example mobile communication system paths between the port locations.

Referring now to the simplified example presented in FIG. 2, eight beam layouts within the satellite coverage area where ships traverse between four ports: Port A, Port B, Port C, and Port D. Port C has ships from Port A, B, and D whereas port D has traffic from port C. Although the total number of ships in the satellite coverage may be constant at any given time, a simultaneous number of ships in a beam (e.g., Beam 7) can vary depending on the routing plans.

FIG. 3 illustrates an exemplary average number of ships and peak number of ships over a year period. For beams that have ports typically have a higher peak-to-mean number of ships than those without them. For example, Beam 7 can have up to 7 ships at the same time. In this example, a designer should allocate more capacity for Beam 7. For an extreme case as Beam 4 where there is no traffic, a designer could allocate no or low capacity. However, it is not obvious how much total capacity that the satellite needs to provide and how much capacity each beam needs to provide. If one designs the satellite capacity to meet the average traffic demand, the user experience at the peak period will be poor, whereas the designing the satellite to meet all the peak demand may not be economical or unnecessary if the peak period is only a very small portion of the time, e.g., only 10 minutes per year.

For simplicity of explanation, although it is assumed that the number of users in each ship is the same, a generalization to non-equal user population among different ships is relatively straightforward.

Proper metrics may be used to determine required satellite capacity to serve moving user terminals. Disclosed herein are metrics that could be used to design satellite and beam capacity.

Let us first denote the concurrent number of users in a k-th beam over a period of time $t \in T$ as $N^{(k)}(t)$. The following statistical metrics can be derived for the defined variable $N^{(k)}(t)$ $$\text{Mean}: E[N^{(k)}(t)] = \frac{\sum_{t \in T} N^{(k)}(t)}{T} \quad (2)$$

$$\text{Peak}: \max_{t \in T}[N^{(k)}(t)] \quad (3)$$

Cumulative probability distribution function: $CDF_k(x) = \text{Prob}\{N^{(k)}(t) \leq x\}$ (4)

For mobile user traffic, some beams may have very high amount of traffics for a small faction of time (denoted as $T_{active}$) whereas the beam is idle most of the time (denoted as $T_{inactive}$). In other words, $T_{active} \ll T_{inactive}$. In this situation, the mean value is very small although the peak value could be high. Designing satellite capacity to the mean or peak value will either result in unsatisfactory user experience or wastage of capacity over most of the time. These shortcomings with the mean and peak metrics could be remedied using the mean value while beam has active traffic or users defined as:

$$\text{Mean While Active}(MWA): \frac{\sum_{t \in T} N^{(k)}(t)}{T_{active}} = \qquad (5)$$

$$\frac{T}{T_{active}} \cdot E[N^{(k)}(t)] = \frac{E[N^{(k)}(t)]}{\left[\frac{T_{active}}{T}\right]}$$

Although, capacity allocation based on MWA would improve user experience, sizing the satellite beam capacity with this metric could result in an excessive overdesign (i.e., underutilized) if the beam is active only for a small portion of time. In addition, one cannot differentiate a beam with one ship present for half an hour in a year vs another beam with two ships present all year around in the beam: both of their MWA is 2000 assuming a ship carries 1000 users. A more comprehensive metric would be to utilize the cumulative probability distribution function $CDF_k(x)$ as defined in Equation (4).

The CDF can be readily obtained from historical data or itinerary of the user movement and beam layout as explained in greater detail below. This CDF metric permit a designer to size the beam that can support the desired number of concurrent users at least α fraction of time in a period t∈T, then the target capacity for k-th beam can be set as $$M^{(k)}(\alpha) = CDF_k^{-1}(\alpha) \qquad (6)$$

For example, $M^{(k)}(0.99)=1500$ means 99% of the time, the concurrent number of uses in the k-th beam is less than or equals to 1500. In other words, the concurrent number of users in the k-th beam exceeding 1500 users is less than 1% of the time.

By way of example, for the peak value of 3000, $M^{(k)}(0.99)=1750$ and $M^{(k)}(0.90)=1250$. Similarly, a complementary cumulative distribution can be used to derive $$M^{(k)}(\alpha) = CCDF_k^{-1}(1 - \alpha)$$

by noting that $$CCDF_k(x) = \text{Prob}\{N^{(k)}(t) > x\} = 1 - \text{Prob}\{N^{(k)}(t) \le x\} = 1 - CDF_k(x) \qquad (7)$$

The concurrent number of users in the beam exceeding 1750 users may occur less than 1% of the time.

With the desired satellite coverage defined, a beam layout could be hypothesized for different beam sizes. For each hypothesized beam layout, the number of concurrent users in a beam at each time for all the beams can be counted. This counting process populates a matrix called a "Time-Beam Population Matrix". The dimension of the matrix is T×K. For example, a size of the matrix could be 17520×100 if we consider T=17520 hours (i.e., one year period with a half hour interval) and K=100 beams.

In this "Time-Beam Population Matrix" generation process, one could apply different weights in counting users depending on the user proximity to terrestrial networks. Also, in this process one could convert a unit from a number of ships/airplanes to a number of users. In general, an entry in TBPM matrix can be represented by $$N(t,k) = \alpha \cdot N_P(t,k) + \beta \cdot N_S(t,k) \qquad (8)$$

where α and β are weights, ranging between zero and one, $N_P(t,k)$ is the number of users near a terrestrial network (such as at a port), and $N_S(t,k)$ is the number of users that can only use a satellite network. Each beam layout may be represented as a hexagon shape. In an example, assume the beam has four ships and one port: three ships at sea and one ship at the port on January 1st, 8:00 AM. In this example, if we assume each ship has 1000 users, α=0.2 and β=1.0, N=0.2·1·1000+1.0·3·1000=3200.

Once the TBPM matrix is computed, capacity allocation (in terms of spectrum) over beams can be devised. In a practical system design, due to satellite mass, thermal and power constraints, the total number of beams K and the maximum amount of spectrum (usually an integer multiple of carrier bandwidth) is limited as $$\sum_{k=1}^{K} NC(k) \le NC_{max} \qquad (9)$$

where $NC(k)$ denotes the number of carriers allocated for the k-th beam and $NC_{max}$ denotes the maximum number of carriers that the satellite can support. For example, a satellite can support total 100 carriers and 50 beams. On average, each beam can be assigned with two 100 MHz carriers: for the beams with high traffic, four or more carriers can be assigned by having one or two carriers in the beams with less traffic. One could also decide not to cover certain areas (known as beam pruning) if the traffic density is very low. In this case, more carriers can be assigned for the high traffic beams.

For each beam, traffic density can be computed by counting users over a designated period of time t∈T using the metrics described above. FIG. 4 shows an example of such computed values for different type of traffic density metrics. The collection of such beam traffic density in the satellite footprint is sometimes termed as "Heat Map".

In the example shown in FIG. 4, Beam 4 has a single ship (carrying 1000 users) present only for half an hour of an entire year: no users are in the beam 99.98% of the time. This type of low traffic beam may not warrant satellite beam coverage for economical reason and the metrics derived from the CDF/CCDF could be used for pruning such beams. For example, the metric values of M (0.9) and M (0.95) show zero for Beam 4.

Capacity (in terms of bps) of the k-th beam is given by $$S(k) = NC(k) \cdot W_C(k) \cdot E(k) \qquad (10)$$

where $NC(k)$ is the number of the carrier allocated to the beam, $W_C(k)$ is the carrier bandwidth, and $E(k)$ is the carrier spectral efficiency in terms of bps/Hz. For example, beam can have three carriers $NC(k)=3$, the bandwidth of the carrier is $W_C(k)=100$ MHz, and the spectral efficiency of carrier is $E(k)$ 1.25 bps/Hz. In this example, the beam capacity is 375 Mbps.

Using the beam traffic density metric described above, the number of needed carriers for each beam is computed as $$NC(k) = \left\lceil \frac{D(k) \cdot R_b(k)}{W_C(k) \cdot E(k)} \right\rceil \qquad (11)$$

where $\lceil X \rceil$ denotes the ceiling operation (i.e., value X is rounded up to the nearest integer) and $R_b(k)$ is the target user data rate (e.g., 100 kbps) and $D(k)$ denotes the computed beam traffic density as shown in FIG. 4. For example, if the designer chooses to use CDF 95% as the capacity metric for Beam 7, the target traffic density is D(7)=M (0.95)=5000.

The overall satellite capacity is then, $$C_{system} = \sum_{k=1}^{K} S(k) = \sum_{k=1}^{K} NC(k) \cdot BW(k) \cdot S(k) \quad (12)$$

Figures 5, 6, 7:
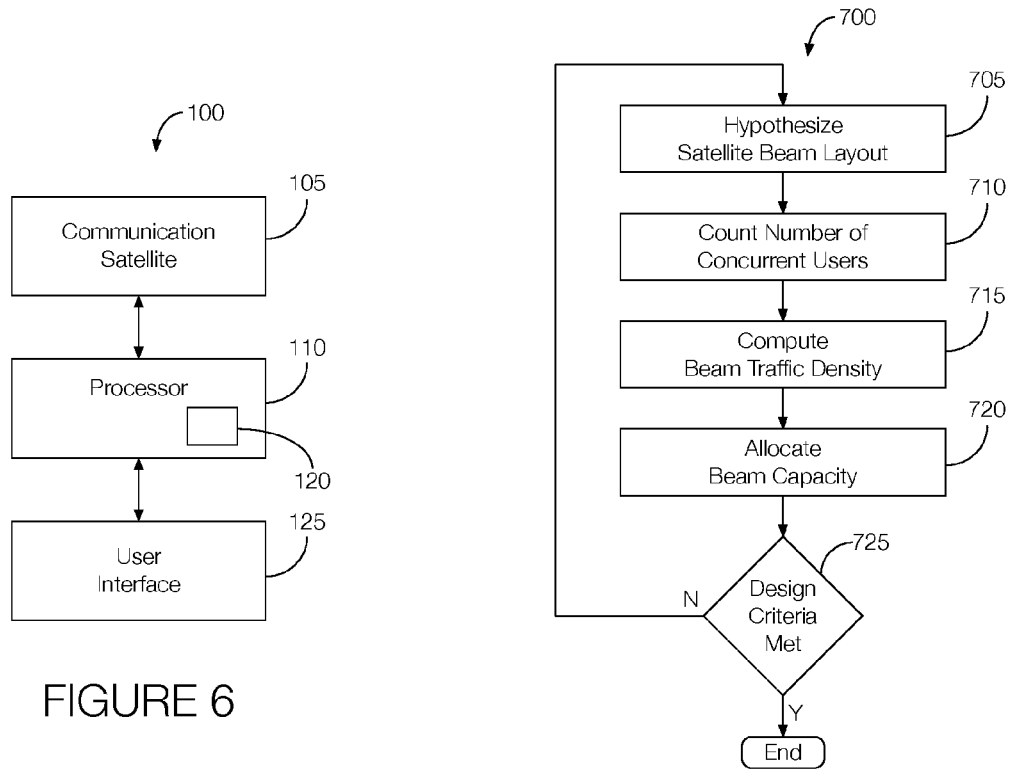
FIG. 5 is a table of example beam capacity allocations using a particular metric.
FIG. 6 is a block diagram of an example telecommunications system with a communication satellite and a processor that determines a capacity of the satellite beams according to a beam traffic density associated with each of the plurality of satellite beams.
FIG. 7 is a flowchart of an example process that may be executed by the processor to determine the capacity of the satellite beams according to the beam traffic density.

FIG. 5 shows a beam capacity allocation using the M (0.95) values from FIG. 4. Beam 7 has 500 Mbps capacity allocation. As the number of carriers is allocated in integers, the allocated capacity will be greater than or equal to the required the required capacity. If the goal is to minimize excessive capacity allocation, one could use slightly lower target α value, for example M (0.93) instead of M (0.95). Since the beam capacity allocation is an iterative process and this adjustment can be done in the iteration process.

The process described above iterates until it meets the following design criteria:

$$CDF_k(N(k)) \geq \alpha \quad (13)$$
$$MWA(k) \geq \lambda_{min}$$
$$\sum_{k=1}^{K} NC(k) \leq NC_{max}$$

For example, the beam capacity allocation shown in FIG. 5 meets the following design criterion α=0.95, $\lambda_{min}$=0, $NC_{max}$=17.

Accordingly, while population density is a good indicator of where satellite beams should be focused—that is, beam capacity is often increased for geographic regions with more people—mobile communications systems can complicate placing beam capacity according to population density. As previously mentioned, cruise ships and airplanes are mobile communications systems that carry relatively large numbers of passengers. Therefore, a cruise ship or airplane traveling through a particular geographic region can place a significant burden on a particular satellite beam. Moreover, if the path of the cruise ship or airplane is unknown, every beam from a particular satellite may be designed to accommodate cruise ships and airplanes, even if cruise ships and airplanes never actually enter into the geographic region associated with the beam.

One solution presented above is to consider historical data when placing beam capacity. For instance, based on the locations of various ports and the most likely paths between the ports according to the historical data, satellite beam capacity can be allocated so that the greatest capacity is given to those beams that experience mobile communication system traffic. That is, a processor, with a memory storing instructions executable by the processor, may determine a capacity of a plurality of satellite beams based at least in part on a beam traffic density associated with each of the plurality of satellite beams. The processor may be incorporated into a telecommunications system that includes a communication satellite programmed to transmit signals in accordance with a plurality of beams.

The beam traffic density may be based on a variety of factors such as, e.g., the number of concurrent users, historically, in each region; a ratio of an average number of concurrent users to a peak number of concurrent users in each region; and a probability that the number of concurrent users at each region is below a predetermined threshold over a predetermined period of time. Other factors may be considered as well. For instance, beam throughput may be based on the number of carriers associated with a particular beam, the amount of bandwidth associated with the carriers associated with each of the satellite beams, and the spectral efficiency of the carriers.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
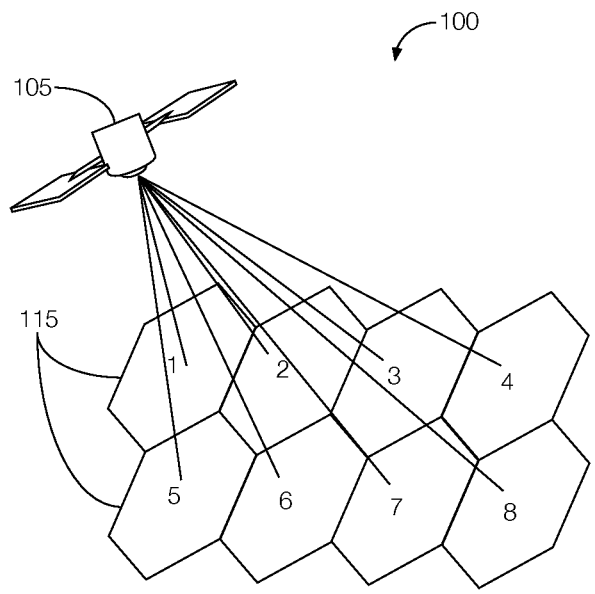
FIG. 1 illustrates an example telecommunications system with a single satellite servicing multiple geographic regions via multiple satellite beams.

Referring to FIG. 6 and with continued reference to FIGS. 1 and 2, a telecommunications system 100 incorporating the concept presented above includes a communication satellite 105 and a processor 110.

The communication satellite 105 may include any number of components that facilitate satellite communication between a terrestrial transmitter and terrestrial receiver. The communication satellite 105 may orbit the Earth. Examples of orbits may include a low earth orbit, a medium earth orbit, a geostationary orbit, or the like. The communication satellite 105 may include components that transmit signals in accordance with multiple beams 115, and each beam may be generated in accordance with a control signal, described in greater detail below. Each beam 115 may be associated with a particular geographic region, especially if the communication satellite 105 is in geostationary orbit. In other words, each beam 115 may define a particular geographic region, and geographically adjacent beams 115 may use different frequencies to, e.g., reduce interference. While eight beams 115 are shown in FIG. 1, the communication satellite 105 may transmit more or fewer beams 115. Moreover, for purposes of clarity and simplicity, the beams 115 shown in, e.g., FIG. 1 are of approximately equal size. However, the beams 115 may have different sizes.

The processor 110 may include any number of electronic components, including circuitry, that can determine a traffic density associated with each beam 115 of the communication satellite 105 and determine a capacity for each beam 115 based at least in part on the traffic density. The processor 110 may be further programmed to transmit, to the communication satellite 105, a control signal that commands the communication satellite 105 to generate and transmit satellite beams in accordance with (e.g., each beam covering particular geographic regions) the traffic density determined by the processor. Transmitting the control signal to the communication satellite 105 may be a one-time event when, or may occur continuously in, e.g., real-time. Therefore, the communication satellite 105 may operate in accordance with the initial control signal or may dynamically update the beam 115 capacity according to additional control signals received from the processor 110. The beam 115 traffic density may be based on various factors including a historical number of concurrent users in each of the beams 115 generated by the communication satellite 105. The number of concurrent users may refer to the number of people in a particular geographic region defined by the beam 115 who access a network via the communication satellite 105 at the same time (i.e., simultaneously). The processor 110 may be programmed to allocate a greater capacity to beams 115 with a historically greater number of concurrent users.

Other factors for determining the traffic density may include a peak-to-average ratio associated with each of the beams 115. The peak-to-average ratio may be defined as a ratio of an average number of concurrent users to a peak number of concurrent users. The average number of concurrent users may be based on a particular timeframe (e.g., a predetermined period of time). The peak number of concurrent users may refer to, historically, the greatest number of people who have simultaneously attempted to access a network via a particular beam 115 of the communication satellite 105. In some instances, the peak number of concurrent users may further refer to the greater number of people who have simultaneously attempted to access the network from a particular geographic region. The processor 110 may be programmed to allocate a greater capacity to beams 115 with higher peak-to-average ratios since those beams 115 are more likely to have a greater number of concurrent users.

Additional factors for determining the traffic density may include the average number of concurrent users over a predetermined period of time and a probability that a number of concurrent users in each of the plurality of satellite beams 115 is below a predetermined threshold over a predetermined period of time. Put another way, the processor 110 may be programmed to determine the traffic density for a particular beam 115 based on how likely it is that a certain number of people (e.g., either an average number of users or some percentage of the peak number of concurrent users) will attempt to access the network via the beam 115 at the same time. In the case where the probability is considered, the processor 110 may be programmed to compare the probability to a predetermined threshold related to the amount of time that or a different number of users are in the geographic region associated with the beam 115. The processor 110 may be programmed to allocate lower capacity to beams 115 where the probability is below the predetermined threshold since, e.g., it is unlikely that the beam 115 will experience a high number of concurrent users over an extended period of time. Moreover, the processor 110 may be further programmed to allocate greater capacity to beams 115 with a higher average number of concurrent users and lower capacity to beams 115 with a lower average number of concurrent users.

Besides the number of concurrent users, the processor 110 may be further programmed to allocate beam 115 capacity according to telecommunications characteristics of one or more telecommunications carriers. A telecommunications carrier may refer to an entity that provides communication services via the telecommunication system. Multiple telecommunications carriers may be associated with a single communication satellite 105. That is, a single communication satellite 105 may be used to facilitate communications for the customers of multiple telecommunications carriers.

Each telecommunications carrier may provide service to its customers in accordance with a particular bandwidth. The bandwidth may relate to the amount of data that can be transmitted over the network over a period of time. Another factor called spectral efficiency may define to the rate at which data can be transmitted over a given bandwidth. The processor 110, therefore, may be programmed to consider the bandwidth, the spectral efficiency, or both, of each telecommunications carrier using the communication satellite 105 when allocating beam 115 capacity. For instance, the processor 110 may be programmed to allocate a beam 115 throughput to each beam 115 based, at least in part, on the bandwidth, spectral efficiency, or both, of each carrier using the communication satellite 105. The beam 115 throughput may refer to, e.g., the number of bits per second that can be transmitted through each beam 115. The number of carriers using a particular communication satellite 105 may further play a role in allocating beam 115 throughput. For example, a greater beam 115 throughput may be allocated to beams 115 used by multiple carriers than beams 115 used by fewer or only a single carrier.

The processor 110 may access data and computer-executable instructions stored in a memory 120. The memory 120 may include an electronic storage medium that can temporarily or permanently store data. The processor 110 may access the data stored in the memory 120, execute instructions stored in the memory 120, and store the result of the data in the memory 120. Further, the processor 110 may output various data to a display device so that the data that results from the processing performed can be presented to, e.g., a user.

The user interface 125 may include any combination of electronic components, including circuits, that can present information to the user and receive user inputs. The user interface 125 may be configured, programmed, or both, to present data from the memory 120 or otherwise output by the processor 110. The user interface 125 may be further configured, programmed, or both, to receive user inputs. Accordingly, the user interface 125 may include a display device, such as computer monitor or screen, a user input device, such as a keyboard, mouse, or a combination of any one or more of these components such as a touchscreen. Thus, the user interface 125 may be incorporated into a computer, such as desktop, laptop, or tablet computer, a mobile device such as mobile phones, or the like.

FIG. 7 is a flowchart of an example process that may be executed by, e.g., the processor 110 to determine the capacity of the beams 115 according to the beam 115 traffic density associated with each of the beams 115.

At block 705, the processor 110 may hypothesize the satellite beam 115 layout. For instance, the processor 110 may receive a user input, via the user interface 125, representing the desired satellite coverage defined, a proposed beam 115 layout with, e.g., different beam 115 sizes, or a combination of these and possibly other factors.

At block 710, the processor 110 may determine the number of concurrent users. The number of current users may be determined via a user input, via the user interface 125, representing the number of concurrent users in each beam 115. The processor 110 may populate the beam 115 traffic density matrix discussed above using the number of concurrent users.

At block 715, the processor 110 may compute the beam 115 traffic density according to the beam 115 traffic density metric discussed above. For instance, the processor 110 may compute the beam 115 traffic density metric according to the factors identified with respect to Equations (2)-(6).

At block 720, the processor 110 may allocate beam 115 capacity for each beam 115. Allocating beam 115 capacity may include allocating the beam 115 capacity according to the beam 115 traffic density computed at block 715 and in accordance with Equations (10)-(12).

At decision block 725, the processor 110 may determine whether the design criteria have been met. As discussed above, the design criteria may consider the cumulative probability distribution function, the mean while active function, the number of carriers, and so on. If the design criteria have been met, the process 700 may end. Otherwise, the process 700 may return to block 705 so that a different hypothetical beam 115 layout may be considered relative to the design criteria. The process 700, therefore, may be iteratively performed until all design criteria are satisfied.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or hand-held computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A processor comprising a memory storing instructions executable by the processor, the instructions including:
   determining a beam traffic density based at least in part on a peak-to-average ratio associated with each of a plurality of satellites beams, wherein the peak-to-average ratio includes a ratio of an average number of concurrent users to a peak number of concurrent users of one of the plurality of satellite beams;

determining a capacity of each of the plurality of satellite beams based at least in part on the beam traffic density associated with each of the plurality of satellite beams; and transmitting, to a communication satellite, a control signal that commands the communication satellite to transmit the plurality of satellite beams in accordance with the beam traffic density determined by the processor.

2. The processor of claim 1, wherein the instructions include determining the beam traffic density based at least in part on a number of concurrent users in each of the plurality of satellite beams.

3. The processor of claim 1, wherein the instructions include determining the beam traffic density for each of the plurality of satellite beams over a predetermined period of time.

4. The processor of claim 1, wherein the instructions include determining the beam traffic density based at least in part on a probability that a number of concurrent users in each of the plurality of satellite beams is below a predetermined threshold over a predetermined period of time.

5. The processor of claim 1, wherein the instructions include determining the beam traffic density based at least in part on an average number of concurrent users in each of the plurality of satellite beams over a predetermined period of time.

6. The processor of claim 1, wherein the instructions include determining the capacity of each of the plurality of satellite beams based at least in part on a bandwidth associated with at least one carrier associated with each of the plurality of satellite beams and a spectral efficiency associated with the at least one carrier.

7. The processor of claim 6, wherein the instructions include allocating a beam throughput to each of the plurality of satellite beams based at least in part on the bandwidth associated with the at least one carrier.

8. The processor of claim 7, wherein the instructions include allocating the beam throughput to each of the plurality of satellite beams based at least in part on a number of carriers associated with each of the plurality of satellite beams.

9. The processor of claim 7, wherein the communication satellite allocates the capacity of each of the plurality of satellite beams based at least in part on the control signal.

10. A telecommunications system comprising:
a communication satellite programmed to transmit signals in accordance with a plurality of beams;
a processor having a memory storing instructions executable by the processor, wherein the processor is programmed to determine a capacity of each of the plurality of beams based at least in part on a beam traffic density associated with each of the plurality of beams,
wherein the processor is programmed to determine the beam traffic density based at least in part on a peak-to-average ratio associated with each of the plurality of beams,
wherein the peak-to-average ratio includes a ratio of an average number of concurrent users to a peak number of concurrent users of one of the plurality of beams.

11. The telecommunications system of claim 10, wherein the processor is programmed to determine the beam traffic density based at least in part on a number of concurrent users in each of the plurality of beams.

12. The telecommunications system of claim 10, wherein the processor is programmed to determine the beam traffic density for each of the plurality of beams over a predetermined period of time.

13. The telecommunications system of claim 10, wherein the processor is programmed to determine the beam traffic density based at least in part on a probability that a number of concurrent users in each of the plurality of beams is below a predetermined threshold over a predetermined period of time.

14. The telecommunications system of claim 10, wherein the processor is programmed to determine the beam traffic density based at least in part on an average number of concurrent users in each of the plurality of beams over a predetermined period of time.

15. The telecommunications system of claim 10, wherein the processor is programmed to determine the capacity of each of the plurality of beams based at least in part on a bandwidth associated with at least one carrier associated with each of the plurality of beams and a spectral efficiency associated with the at least one carrier.

16. The telecommunications system of claim 15, wherein the processor is programmed to allocate a beam throughput to each of the plurality of beams based at least in part on the bandwidth associated with the at least one carrier.

17. The telecommunications system of claim 16, wherein the processor is programmed to allocate a beam throughput to each of the plurality of beams based at least in part on a number of carriers associated with each of the plurality of beams.

18. The telecommunications system of claim 10, wherein the processor is programmed to generate a beam layout that includes each of the plurality of beams and iteratively update the beam layout in accordance with the capacity of each of the plurality of beams.

19. A processor comprising a memory storing instructions executable by the processor, the instructions including:
determining a capacity of each of a plurality of satellite beams based at least in part on a beam traffic density associated with each of the plurality of satellite beams, a bandwidth associated with at least one carrier associated with each of the plurality of satellite beams, and a spectral efficiency associated with the at least one carrier;
allocating a beam throughput to each of the plurality of satellite beams based at least in part on the bandwidth associated with the at least one carrier and a number of carriers associated with each of the plurality of satellite beams; and
transmitting, to a communication satellite, a control signal that commands the communication satellite to transmit the plurality of satellite beams in accordance with the beam traffic density determined by the processor.

20. A telecommunications system comprising:
a communication satellite programmed to transmit signals in accordance with a plurality of beams; and
a processor having a memory storing instructions executable by the processor, wherein the processor is programmed to determine a capacity of each of the plurality of beams based at least in part on a beam traffic density associated with each of the plurality of beams, determine the capacity of each of the plurality of beams based at least in part on a bandwidth associated with at least one carrier associated with each of the plurality of beams and a spectral efficiency associated with the at least one carrier, and allocate a beam throughput to each of the plurality of beams based at least in part on the bandwidth associated with the at least one carrier and on a number of carriers associated with each of the plurality of beams.

* * * * *